United States Patent [19]
Bell

[11] 4,404,949
[45] Sep. 20, 1983

[54] HEATED DIESEL FUEL FILTER

[75] Inventor: Lon E. Bell, Altadena, Calif.

[73] Assignee: Technar Incorporated, Arcadia, Calif.

[21] Appl. No.: 215,537

[22] Filed: Dec. 11, 1980

[51] Int. Cl.³ .............................................. F02M 31/00
[52] U.S. Cl. ..................................... 123/557; 123/549; 219/205; 210/184
[58] Field of Search ....................... 123/557, 552, 549; 210/180, 182, 184, 183, 181, 340, 175, 185, 186; 219/281, 205, 206, 306, 307, 316, 381, 202

[56] References Cited

U.S. PATENT DOCUMENTS

| | | | |
|---|---|---|---|
| 2,103,434 | 12/1937 | Pennebaker | 210/182 |
| 2,218,715 | 10/1940 | MacCormack | 210/186 |
| 2,306,984 | 12/1942 | Jolman | 210/186 |
| 2,729,338 | 1/1956 | Heigl | 210/186 |
| 2,902,158 | 9/1959 | Muller | 210/184 |
| 4,091,265 | 5/1978 | Richards | 219/202 |
| 4,201,044 | 5/1980 | Dodd | 210/186 |
| 4,295,966 | 10/1981 | LeBlanc | 210/180 |

FOREIGN PATENT DOCUMENTS

| | | | |
|---|---|---|---|
| 451491 | 9/1948 | Canada | 210/186 |
| 313229 | 5/1956 | Switzerland | 219/381 |
| 1337684 | 11/1973 | United Kingdom | 219/381 |

*Primary Examiner*—Ronald H. Lazarus
*Attorney, Agent, or Firm*—Christie, Parker & Hale

[57] ABSTRACT

A diesel fuel filter in which wax crystals that tend to clog the filter at low ambient temperatures are directly heated to melt the crystals, allowing them to pass through the filter. A low energy heating element is positioned adjacent the filter element in the region where wax normally accumulates. The heater melts the wax without significantly raising the temperature of the fuel.

3 Claims, 5 Drawing Figures

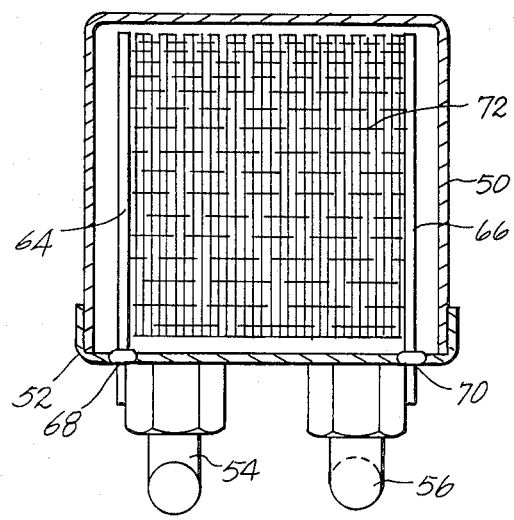
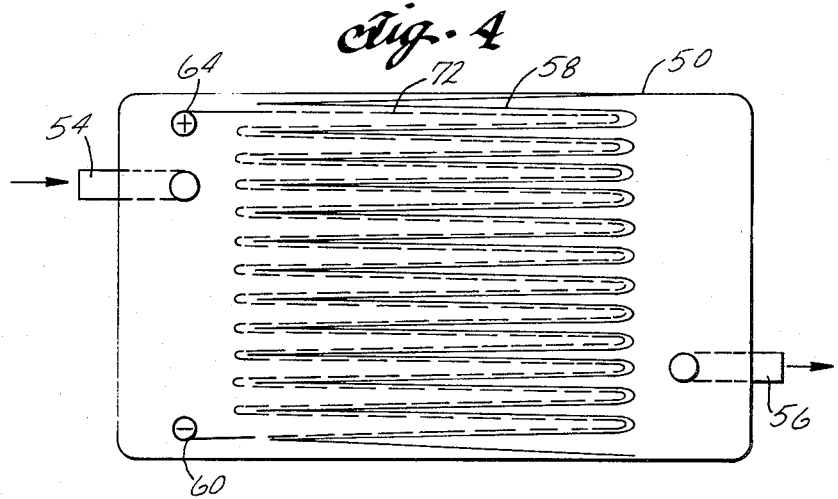
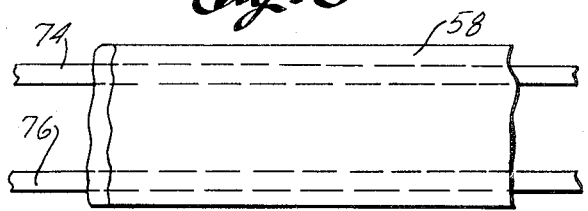

HEATED DIESEL FUEL FILTER

FIELD OF THE INVENTION

This invention relates to diesel fuel heaters, and more particularly, to a heater for dissolving wax in the fuel.

BACKGROUND OF THE INVENTION

In co-pending application Ser. No. 174,916 filed Aug. 4, 1980, entitled "Fuel Heater for Diesel Engines," there is described an arrangement for heating the fuel for diesel engines to prevent the fuel filter from becoming clogged with wax crystals which form in the fuel at low ambient temperatures. The heater arrangement described in the above-identified application utilizes an electric heater surrounding the fuel line which heats the fuel as it moves through the fuel line. By warming the fuel, the wax crystals are caused to go back into solution and thereby pass through the fuel filter. However, the amount of energy required to raise the temperature of the fuel sufficiently above ambient temperature to dissolve the wax in the fuel is quite substantial. This may place a severe strain on the capacity of the electrical system at a time when low ambient temperature conditions also reduce the capacity of the battery.

SUMMARY OF THE INVENTION

The present invention is directed to an improved fuel heater that operates to melt the wax crystals and keep them melted as they pass through the fuel filter. By directly heating and melting the wax crystals, it is not necessary to raise the temperature of the liquid fuel to a level at which the fuel dissolves the wax. Thus the present invention provides an arrangement for directly heating the wax rather than indirectly heating the wax by heating the fuel in which the wax crystals are suspended. As a result, the energy requirement of the present diesel fuel heater is substantially reduced over heaters in the past which have operated to raise the temperature of all the fuel passing through the filter.

In brief, this is accomplished by providing a heater that is in close proximity to the filter and immersed in the oil in the region where the wax accumulates on the surface of the filter. As the wax builds up in a particular area of the filter, flow of oil in that region is reduced. This allows the temperature of the wax due to the heater to rise, causing the wax to melt and go back into solution. More uniform flow can be achieved by using two filters and heaters in parallel flow paths so that the flow alternates between the two filters.

BRIEF DESCRIPTION OF THE DRAWINGS

For a more complete understanding of the invention, reference should be made to the accompanying drawings, wherein:

FIG. 3 is a sectional view taken substantially on the line 3—3 of FIG. 2;

FIG. 4 is a top view of another embodiment of the present invention; and

FIG. 5 is a detailed view of a heated filter element construction.

DETAILED DESCRIPTION

Figure 1:
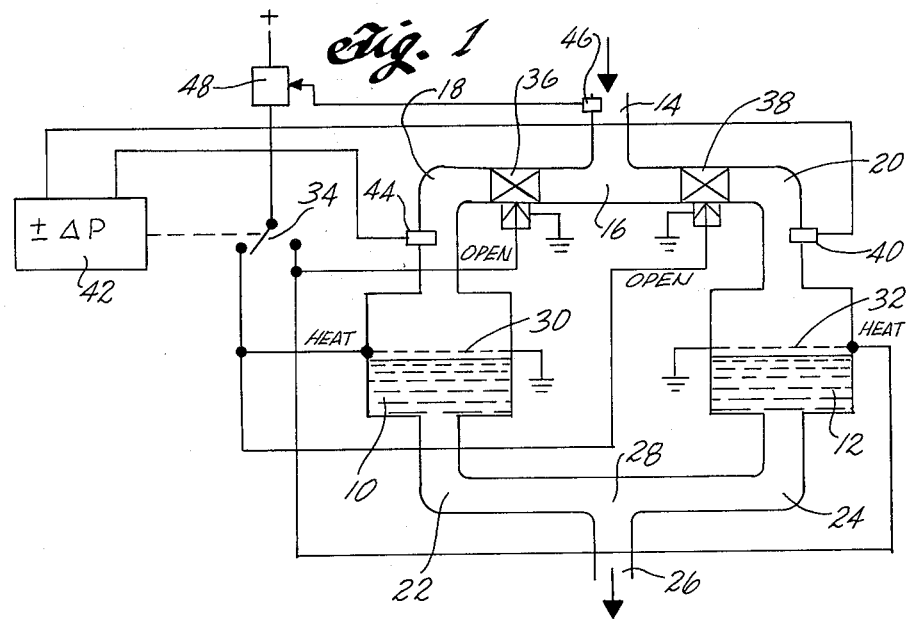
FIG. 1 is a diagrammatic showing of the invention.

Referring to FIG. 1, there is shown a fuel filtering system including a pair of filters 10 and 12. The fuel is directed through the filters from an input fuel line 14 which is connected through a T-junction 16 to a pair of filter input lines 18 and 20 connected to the input of the filters 10 and 12. Output lines 22 and 24 from the filters connect to an output line 26 through a T-junction 28. Thus two parallel flow paths are provided through the filters.

As mentioned above, when diesel fuel is chilled by low ambient temperature conditions, wax begins to precipitate out of the fuel. This wax tends to accumulate in the filters 10 and 12, clogging the filters and substantially reducing or cutting off the flow of fuel to the output line 26. According to the present invention, each filter unit is provided with a heating element in the form of a screen or grid, as indicated at 30 and 32, which is made of an electrically conductive material that is heated by a flow of current passing through the grid. To this end, each of the grids is connected through a switch 34 to one terminal of a battery or other electrical power source (not shown). The switch 34 allows one or the other of the heater grids 30 or 32 to be heated. The switch 34 is also used to control the flow of fluid through the respective filters by selectively operating a pair of solenoid valves 36 and 38.

It will be seen that when the heater 30 is turned on by the switch 34, the valve 38 is turned on and the valve 36 is turned off. This interrupts the flow of oil through the filter 10 when the heater 30 is turned on, but allows flow of the oil through the filter 12 while the heater 32 is turned off. As the oil flows through the filter 12, the wax crystals build up on the surface of the filter and on the grid of the heater, gradually reducing the flow of oil through the filter. At the same time, wax which has accumulated on the surface of the filter 10 is heated by the heater 30, causing the wax to melt and go back into solution. As flow is reduced through the filter 12, pressure builds up in the line 20. This pressure is sensed by a suitable pressure sensitive transducer 40 which is connected to a relay control circuit 42 for operating the switch 34. The relay control circuit 42 also senses the pressure in the line 18 by means of a pressure transducer 44. As the pressure builds up in the line 20, the switch 34 is actuated, causing the valve 36 to open and the valve 38 to close and, at the same time, causing the heating element 30 to be turned off and the heating element 32 to be turned on.

With the wax having been melted in the filter 10, fuel again flows freely through the filter 10 while the wax built up in the filter 12 is dissolved by the heater 32. As the wax begins to build up in the filter 10, a pressure in the line 18 begins to build up to the point that the switch 34 is again actuated to reverse the condition of the valves and heaters.

By the arrangement shown in FIG. 1, it will be seen that oil flows alternately through the two filters. The wax is directly heated by the heater in the non-flowing filter, causing the wax to go back in solution. This is accomplished without attempting to raise the temperature of the oil as it flows through the filter system. A minimum of electrical energy is expended in clearing the filters of wax and at the same time providing a continuous flow of filtered oil through the fuel line.

While the arrangement in FIG. 1 shows electrically controlled valves, it will be understood that the pressure built up can be used to operate directly a check valve to cut off flow through the clogged filter. Alternatively, the system of FIG. 1 can be operated without any valves at all by utilizing the inherent characteristic of the system to produce buildup of wax and a reduced flow alternately in one filter and the other. Furthermore, both heaters can be operated continuously at a low level of heat. The system tends to be self-oscillating since any buildup of wax reduces the flow, allowing the temperature of the heater to rise and thereby increasing the rate at which the wax is dissolved. Thus the buildup and melting of wax takes place cyclically in the respective filters, with flow tending to alternate between one filter and then the other.

A temperature sensing element 46 may be provided in the inlet line 14 for sensing when the temperature of the fuel is above a predetermined level at which the wax remains in liquid form. The element 46 operates a switch device 48 to interrupt power to the heaters when the temperature of the fuel rises to a safe level.

Figure 2:
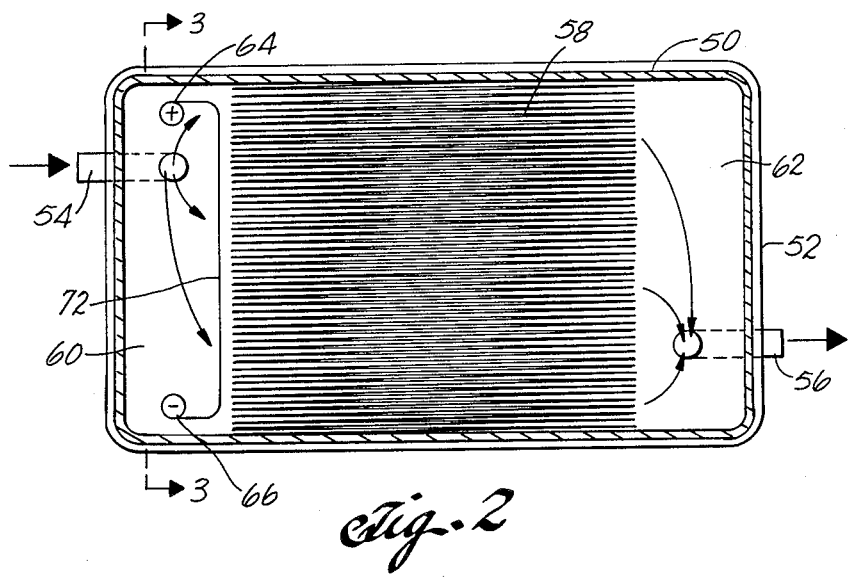
FIG. 2 is a top view with the cover removed of a filter according to one embodiment of the invention.

While the dual filter arrangement of FIG. 1 provides continuous flow with minimum energy input, a low energy system can be provided within a single filter element. The essential feature of the invention is that there is a concentration of wax buildup and selective heating of the wax to melt the wax at the filter so that it does not solidify before it passes out through the filter element. Referring to FIGS. 2 and 3, there is shown a filter construction incorporating the features of the present invention which can be operated either as a single filter system or as a dual filter system of the type described in FIG. 1. The filter itself is of conventional construction, including an outer housing or can 50 having a lid 52. An inlet pipe 54 connects through the lid adjacent one end of the can 50, and an outlet pipe 56 connects through the lid at the other end of the can. A filter element, folded in accordian fashion, extends across the center of the can and lid, dividing the can into an inlet chamber 60 and an outlet chamber 62. Oil entering the inlet chamber passes through the filter element 58 into the outlet chamber. The ends of the filter element 58 are glued or cemented to the sides of the can while the edges of the filter are glued or cemented to the bottom of the can and to the lid, so that all the oil must pass through the filter element 58 in passing from the inlet chamber to the outlet chamber.

A pair of electrodes 64 and 66 extend through the lid 52 into the inlet chamber 60. The electrodes are supported by the lid through conventional glass bead or other suitable insulators 68 and 70. A heater element 72, preferably in the form of a wire mesh screen made of suitable electrically conductive material, is connected to and extends between the electrodes 64 and 66. As shown in FIG. 2, the screen is positioned in close proximity to the pleated edges of the filter element 58 so as to bring the heater into as close a proximity to the filter element as is practical. Oil entering the filter first passes through the heater screen 72. As wax crystals accumulate on the screen and in the space between the screen and the filter, oil flow is reduced, allowing the temperature of the heater to rise and causing a slow flow of highly heated fuel to melt the wax and allow it to pass on through the filter.

The filter of FIGS. 2 and 3 can be used in a dual filter arrangement such as described in connection with FIG. 1 or may be operated as a single filter unit. Generally, flow is not uniform over the entire surface of the heater so that as flow becomes restricted due to accumulation of wax in one area, flow increases in another area. In the area in which flow is decreased, the wax is heated directly by the heater, causing it to dissolve in the fuel and allowing flow in that area to increase. At the same time an area having greater flow rate begins to clog, reducing flow and causing the temperature to rise. This cycling of accumulation, heating, dissolving, followed by increased flow with cooling and more clogging, takes place over the entire surface of the heater, but the phase relationship of the cycle is different in different areas, resulting in fairly uniform total flow rates. The energy input to the heater is substantially less than would be required to heat all of the oil passing through the filter up to a temperature sufficient to keep the wax in solution.

FIG. 4 shows an alternative filter design in which the heater grid 72' is folded in accordian fashion so as to extend into the individual pleats in the folded filter 58. This arrangement allows a greater surface of the filter to be in intimate contact with the heater.

FIG. 5 shows a further embodiment in which one or more heater strips such as indicated at 74 and 76 are embedded in the filter material so as to directly heat the surface of the filter on which the wax crystals accumulate. The filter material with the embedded heater strips can be folded in accordian fashion and employed in the filter in the manner described in FIGS. 2-4.

In any of the arrangements described, power may be cycled on and off to the heater to reduce the average power requirements. The turning off and on of the heater may be synchronized with the change in pressure due to alternate clogging and redissolving of the wax with the attendant change in flow rate and back pressure in the filter, as described above in connection with FIG. 1. A temperature sensitive material and switch may be incorporated to supply heat only below a predetermined temperature level. Whether the heater is cycled on or off or is allowed to operate continuously on a relatively low average energy input, there is a concentration of wax crystals in the immediate vicinity of the heater, the wax crystals then being melted sufficiently to pass on through the filter by the close proximity of the heater.

What is claimed is:

1. A heated filter for diesel fuel or a similar type fuel comprising: a source of fuel, a housing forming a fully enclosed chamber, a non-metallic filter element in the chamber dividing the chamber into an inlet region and an outlet region on opposite sides of the filter element, a fuel inlet to the inlet region of the chamber, a fuel outlet to the outlet region of the chamber, and heater means in the inlet region adjacent the filter element, the heater means including an electrical resistance heating element, the resistance heating element comprising a metal grid having openings through which the fuel passes before passing through the filter element, the metal grid being positioned in the path of fuel passing from the inlet to the filter element for heating all fuel passing through the filter, the metal grid being positioned immediately adjacent the filter element so that the fuel flow through the grid at any position is limited by the flow of fuel through the filter at the same position.

2. The filter of claim 1 wherein the heater means includes a pair of spaced electrodes extending into the inlet region, insulating means supporting the electrodes in the housing, the resistance heating element extending between and supported by the electrodes in closely spaced proximity to the filter element for heating any solid material trapped and accumulating on the surface of the filter element.

3. The filter of claim 1 wherein the filter element is made of thin pleated filter material and the metal grid is folded so as to extend into the folds of the pleated filter element.

* * * * *